United States Patent [19]
Glamkowski et al.

[11] 3,887,620
[45] June 3, 1975

[54] N-DIALKYLPHOSPHINYLALKYL PHENOXYANILINES

[75] Inventors: Edward J. Glamkowski, Warren; Joseph T. Strupczewski, Piscataway, both of N.J.; Erhard H. Wolf, Hofheim/Taunus, Germany

[73] Assignee: American Hoechst Corporation, Bridgewater, N.J.

[22] Filed: June 5, 1973

[21] Appl. No.: 367,108

[52] U.S. Cl........ 260/571; 260/471 C; 260/556 AR; 260/558 R; 260/562 A; 260/570.8 R; 260/570.9; 260/479 R; 260/501.21; 260/558 D; 424/300; 424/311; 424/321; 424/330

[51] Int. Cl.................. C07c 93/14; C07c 103/10; C07c 103/30

[58] Field of Search.......................... 260/571, 570.9

*Primary Examiner*—Lewis Gotts
*Assistant Examiner*—S. P. Williams
*Attorney, Agent, or Firm*—Curtis, Morris & Safford

[57] ABSTRACT

Novel phenoxyanilines which are N-substituted with dialkylphosphinylalkyl and methods of preparing the same are described. These compounds have central nervous system depressant, sedative and anticonvulsant properties.

8 Claims, No Drawings

N-DIALKYLPHOSPHINYLALKYL PHENOXYANILINES

This invention relates to novel phenoxyanilines which are N-substituted with dialkylphosphinylalkyl and which optionally are further N-substituted with various organic groups, as well as to a method of treatment therewith, and to pharmaceutical compositions containing them.

N-dialkylphosphinylalkyl phenoxyanilines represent a new class of compounds not known to have previously been reported in the literature. Simpler phenoxyanilines are known and have been shown to possess biological activity in living organisms. For example, antitubercular activity [V. C. Barry, L. O'Rourke, and D. Twomey, Nature, 160, 800 (1947)] and effectiveness against infection in rabbits, sheep and cattle by fasciola hepatica (liver flukes) [G. Laemmler and H. Loewe, Arzneimittel-Forsch., 12, 164 (1962)] have been demonstrated. Some carbamic acid derivatives of phenoxyaniline are reported to have herbicidal activity [Brit. 913,383 (December 19, 1962)].

The novel phenoxyanilines of this invention, bearing the dialkylphosphinylalkyl group, are now shown to possess central nervous system depressant, sedative and anticonvulsant properties in mammals.

More specifically, the invention relates to compounds of the formula

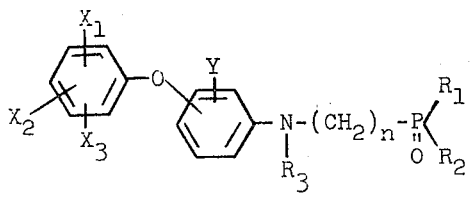

wherein
$R_1$ and $R_2$ stand for alkyl of 1 to 4 carbon atoms,
$n$ is an integer from 1 to 4,
$R_3$ is hydrogen, alkyl of 1 to 6 carbon atoms, aralkyl of 7 to 8 carbon atoms, alkanoyl of 2 to 5 carbon atoms, phenacyl, halophenyacyl, aroyl, arylsulfonyl, alkoxycarbonyl of 2 to 5 carbon atoms, arylxycarbonyl or aralkoxycarbonyl;
$X_1$, $X_2$, $X_3$ and $Y$ are hydrogen, halogen, hydroxy, nitro, amino, trifluoromethyl, phenyl, alkyl of 1 to 4 carbon atoms, cycloalkyls of 3 to 7 carbon atoms, alkoxy of 1 to 4 carbon atoms, alkoxycarbonyl of 2 to 5 carbon atoms, alkylamino or dialkylamino of 1 to 4 carbon atoms in each alkyl group, or alkanoylamino of 1 to 4 carbon atoms and to pharmaceutically acceptable acid addition salts of the above compounds.

The substituted or unsubstituted phenoxy group may be in the ortho, meta or para position in relation to the anilino moiety.

The compounds that are preferred are those in which $R_1$ and $R_2$ are alkyl of 1 to 4 carbon atoms, preferably methyl or butyl, $R_3$ is hydrogen, acetyl, chlorophenacyl, fluorobenzoyl, benzyloxycarbonyl or alkoxycarbonyl of 2 to 5 carbon atoms, Y is hydrogen or methyl, $X_1$ is hydrogen, alkyl of 1 to 4 carbon atoms, cyclohexyl, chlorine, fluorine, bromine, trifluoromethyl, phenyl, alkoxy of 1 to 4 carbon atoms, carbomethoxy or dimethylamino, $X_2$ and $X_3$ are hydrogen, and $n$ is 1, 2 or 3.

The compounds of the above formula wherein $R_3$ is hydrogen are prepared by reacting an o-, m-, or p-phenoxyaniline with a dialkylphosphinylalkyl halide or sulfonate ester to form the corresponding N-dialkylphosphinylalkyl phenoxyaniline:

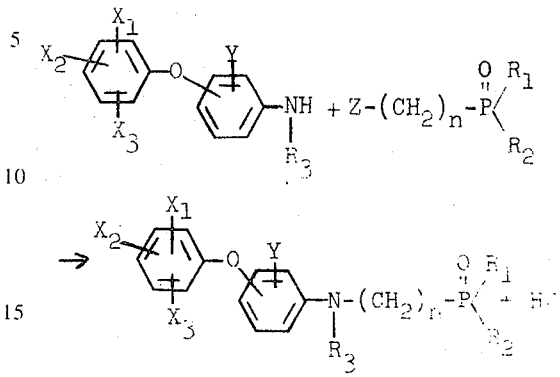

in which $R_1$, $R_2$, $R_3$, $n$, $X_1$, $X_2$, $X_3$ and Y are as defined earlier and Z is a group known in the art to be displaced by primary or secondary amino groups, preferably halogen, such as chlorine, bromine or iodine, or a sulfonic acid ester group $-O-SO_2-R_4$ in which $R_4$ is lower alkyl, especially methyl, or aryl, especially phenyl or tolyl. The reaction is carried out in an inert solvent at a temperature of about 0° to 200°C., preferably about 80° to 150°C. for from 2 to 24 hours. In a preferred embodiment of the process, the reaction is carried out in the presence of an added inorganic base as,, e.g., sodium bicarbonate, or organic base such as triethylamine or 2,4,6-trimethylpyridine, to bind the acid HZ formed during the reaction. However, such an added base is not essential to the success of the preparation because the starting phenoxyaniline can serve as the hydrogen ion acceptor. Solvents which may be used include aromatic hydrocarbons and halogenated aliphatic hydrocarbons such as benzene, toluene, xylene, prehnitene (1,2,3,4-tetramethylbenzene), tetrachloroethane; also dimethylformamide and the like, although the solvent is not critical.

The reaction is most conveniently carried out by refluxing in xylene for 7–15 hours a mixture of the appropriate phenoxyaniline and the dialkylphosphinalkyl halide, using sym. collidine as hydrogen halide acceptor.

Compounds of the above formula wherein $R_3$ is alkyl of 1 to 6 carbon atoms, aralkyl of 7 to 8 carbon atoms, phenacyl or phenacyl substituted by halogen are prepared according to the above described method by reaction of an o-, m- or p-phenoxyaniline having the appropriate $R_3$ substituent. Alternatively, the compounds described above in which $R_3$ is hydrogen can be reacted by methods known in the art with the appropriate alkyl, aralkyl or phenacyl halide in the presence of a suitable inorganic or organic base to neutralize the hydrogen halide liberated.

Compounds of the above formula wherein $R_3$ is alkanoyl of 2 to 5 carbon atoms, aroyl, arylsulfonyl, alkoxycarbonyl of 2 to 5 carbon atoms, aryloxycarbonyl or aralkoxycarbonyl are prepared by reacting compounds of the above formula wherein $R_3$ is hydrogen with the appropriate alkanoyl, aroyl, arylsulfonyl, alkoxycarbonyl, aryloxycarbonyl or aralkoxycarbonyl halide in the presence of a suitable inorganic or organic base to neutralize the hydrogen halide liberated.

Included within the scope of this invention are the pharmaceutically acceptable acid addition salts of the novel N-dialkylphosphinylalkyl phenoxyanilines, prepared according to known, well-established procedures. Representative of such salts are those formed with mineral acids, such as the hydrochloride hydrobromide, sulfate, phosphate and the like, and the organic acid salts, such as the maleate, oxalate, succinate, pamoate, benzoate, p-toluenesulfonate, and the like.

Certain of the phenoxyanilines which are used as starting materials for the production of compounds of the above formula are believed to be novel. They were synthesized by catalytic reduction of the appropriate nitro diphenyloxides using 5 or 10% palladium-on-carbon as catalyst at a pressure of 40-60 p.s.i. in an inert solvent such as dioxane or ethanol. The method of producing such compounds will be further evident from several of the working examples which disclose their preparation in detail. In the following Table I, the phenoxyanilines which are thought to be novel are described with reference to their structural formula, together with their physical data.

The compounds of this invention are useful because of their depressant action on the central nervous system. This activity is demonstrable when the compounds are used in the form of their free base or in the form of their pharmaceutically acceptable acid addition salts.

The depressant effects on the central nervous system were evaluated according to the mouse observation procedure of S. Irwin, Psychopharmacologia, 9, 259 (1966). In this procedure, male COBS mice were dosed orally with the drug, and its effects on behavior and reflex depression together with muscle relaxation were determined by the degree of deviation from control scores. The overall result for three animals in each category for some of the compounds of this invention is expressed in terms of the minimum effective dose (MED) and is recorded in Table II.

The sedative effect of the compounds of this invention was demonstrated by their suppression of the fight- Table I

| COMPOUND FORMULA | $X_1$ | $X_2$ | $X_3$ | $X_4$ | BASE OR SALT | MELTING POINT DEGREES C. |
|---|---|---|---|---|---|---|
| $C_{12}H_{10}FNO$ | H | F | H | H | Base | 56-62 |
| $C_{12}H_{10}ClNO$ | H | H | Cl | H | Oxalate[1] | 161-163° |
| $C_{18}H_{21}NO$ | H | H | H | ⟨S⟩ | Base | waxy semi-solid |
| $C_{13}H_{10}F_3NO$ | H | H | $CF_3$ | H | Sulfate[2] | 215-217°dec. |
| $C_{13}H_{13}NO_2$ | H | H | $OCH_3$ | H | Base | 48-54 |
| $C_{15}H_{17}NO_4$ | $OCH_3$ | $OCH_3$ | $OCH_3$ | H | Base | 148-150° |
| $C_{14}H_{16}N_2O$ | H | H | $N(CH_3)_2$ | H | Base[3] | 144-146° |

1. Calc. for $C_{12}H_{10}ClNO \cdot (COOH)_2$ : 54.29% C, 3.90% H, 4.52% N.
   Found : 54.18% C, 3.83% H, 4.60% N.

2. Calc. for $C_{13}H_{10}F_3NO_2 \cdot H_2SO_4$ : 51.65% C, 3.66% H, 4.64% N.
   Found : 51.35% C, 3.70% H, 4.64% N.

3. Calc. for $C_{14}H_{16}N_2O$ : 73.65% C, 7.06% H, 12.27% N.
   Found : 73.45% C, 7.18% H, 12.27% N.

ing behavior of mice induced by foot-shock, as described by G. Chen, B. Bohner and A. C. Bratton, Jr., Arch. Int. Pharmacodyn., 142, 30 (1963). In this procedure, preselected pairs of male Purina mice are treated orally with the test compound and subjected to a 3-minute period of footshock. The number of fights are recorded for eight pairs of mice. Less than 5 fights during the 3-minute period is considered a significant reduction in agressive behavior. The effective dose ($ED_{50}$) to achieve this reduction in 50% of the animal pairs is shown in Table II for some of the compounds of this invention.

TABLE II

Depressant/Sedative Activity

| Compound: | Med. mg./kg. | $ED_{50}$, mg./kg. |
|---|---|---|
| N-Dimethylphosphinylmethyl-4-phenoxyaniline | 75 | 20 |
| N-Benzyloxycarbonyl-N-dimethyl-phosphinylmethyl-4-phenoxyaniline | 30 | — |
| N-Dimethylphosphinylmethyl-4-(p-tolyloxy)aniline | — | 29 |
| N-Dimethylphosphinylmethyl-4-(o-cyclohexylphenoxy)aniline | 40 | — |
| N-Dimethylphosphinylmethyl-4-(m-chlorophenoxy)aniline | 37 | 40 |

The anticonvulsant activity of the novel compounds of this invention was tested by the methods of J. W. Bastian et al. [J. W. Bastian, W. E. Krause, S. A. Ridlon, and N. Ercoli, J. Pharmacol. Exptl. Therap., 127, 75 (1959)], and Swinyard et al. [H. A. Swinyard, W. C. Brown, and L. S. Goodman, ibid., 106, 319 (1952)]. Male COBS mice were challenged with metrazol, electroshock and strychnine and the minimum effective intraperitoneal dose (MED) in the metrazol test, and the intraperitoneal dose protecting 50% of the mice ($PD_{50}$) against the extensor tonic phase induced by electroshock and strychnine injection are shown in Table II for some of the novel compounds of this invention.

Table III

Anticonvulsant Activity

| Compound: | Metrazol MED, mg./kg. | Electroshock $PD_{50}$, mg./kg. | Strychnine $PD_{50}$, mg./kg. |
|---|---|---|---|
| N-Dimethylphosphinylmethyl-4-phenoxyaniline | 35 | 48 | 37 |
| N-Dimethylphosphinylmethyl-4-(p-tert.-butylphenoxy)aniline | 37 | 39 | 80 |
| N-Dimethylphosphinylmethyl-4-(p-fluorophenoxy)aniline | 40 | 72 | 31 |

Effective quantities of any of the pharmacologically active N-dialkylphosphinylalkyl phenoxyanilines may be administered to a living animal body by any one of various methods, for example, orally as in capsules or tablets, parenterally in the form of sterile solutions or suspensions, and in some cases intravenously in the form of sterile solutions. The free base aniline compounds, while effective themselves, may be formulated and administered in the form of their pharmaceutically acceptable addition salts for purposes of convenience of crystallization, increased solubility and the like.

The active compounds of the present invention may be orally administered, for example, with an inert diluent or with an edible carrier, or they may be enclosed in gelatin capsules, or they may be compressed into tablets. For the purpose of oral therapeutic administration, the active compounds of this invention may be incorporated with excipients and used in the form of tablets, troches, capsules, elixirs, suspensions, syrups, wafers, chewing gum, and the like. These preparations should contain at least 0.5% of active compound, but may be varied depending upon the particular form and may conveniently be between 4% to about 70% of the weight of the unit. The amount of active compound in such compositions is such that a suitable dosage will be obtained. Preferred compositions and preparations according to the present invention are prepared so that an oral dosage unit form contains between 10 and 200 milligrams of active compound.

The tablets, pills, capsules, troches, and the like may also contain the following ingredients: a binder such as microcrystalline cellulose, gum tragacanth or gelatin; an excipient such as starch or lactose, a disintegrating agent such as alginic acid, primogel, cornstarch and the like; a lubricant such as magnesium stearate or sterotex; a glidant such as colloidal silicon dioxide; and a sweetening agent such as sucrose or saccharin may be added or a flavoring agent such as peppermint, methyl salicylate, or orange flavoring. When the dosage unit form is a capsule, it may contain, in addition to materials of the above type, a liquid carrier such as a fatty oil. Other dosage unit forms may contain other various materials which modify the physical form of the dosage unit, for example, as coatings. Thus, tablets or pills may be coated with sugar, shellac, or other enteric coating agents. A syrup may contain, in addition to the active compounds, sucrose as a sweetening agent, and certain preservatives, dyes and colorings, and flavors. Materials used in preparing these various compositions should be pharmaceutically pure and non-toxic in the amounts used.

For parenteral administration, the carrier or excipient may be a sterile, parenterally acceptable liquid; e.g., water or a parenterally acceptable oil; e.g., arachis oil contained in ampules.

The following examples will further illustrate this invention without the latter being limited thereto.

IR and NMR analyses were found to be consistent with the structures of the compounds. Temperatures are given in degrees C.

EXAMPLE 1

N-Dimethylphosphinylmethyl-4-phenoxyaniline

A stirred mixture of 18.5 g. (0.10 mole) of 4-phenoxyaniline, 25.3 g. (0.20 mole) of chloromethyl dimethylphosphine oxide, and 13.3 g. (0.11 mole) of sym. collidine in 200 ml. of xylene was refluxed under nitrogen for 7 hrs. The reaction mixture was then cooled to room temperature and dissolved in 250 ml. of chloroform. This solution was washed with water, dried over anhydrous sodium sulfate and concentrated on the rotovac to a small volume. The product which separated was filtered, washed with xylene and hexane and dried to afford 17.6 g. of product (64% yield); m.p. 126°–130°. Recrystallization from acetone gave pure white crystals, m.p. 130°–132°.

| Anal. Calc. for $C_{15}H_{18}NO_2P$ | : 65.44% C, 6.59% H, 5.08% N. |
|---|---|
| Found | : 65.21% C, 6.46% H, 4.96% N. |

The hydrochloride salt was prepared as follows. A stirred solution of 6.0 g. (0.022 mole) of N-dimethylphosphinylmethyl-4-phenoxyaniline in 20 ml. of ethanol was saturated with gaseous hydrogen chloride. 84 ml. of ether were added dropwise to the resulting mixture over a 30 min. period. The salt was then filtered, washed with ether and dried to afford 6.83 g. (100% yield) of white crystals. After recrystallization from methanol/acetone, the pure hydrochloride salt was obtained having a m.p. of 158.5°–161.5°, dec. when a sample is immersed in the m.p. bath preheated to 153°.

| Anal. Calc. for $C_{15}H_{18}NO_2P \cdot HCl$ | :57.78% C, 6.14% H, 4.49% N. |
|---|---|
| Found | : 57.85% C, 6.17% H, 4.75% N. |

EXAMPLE 2

N-Dimethylphosphinylmethyl-N-p-chlorophenacyl-4-phenoxyaniline

A stirred mixture of 4.13 g. (0.015 mole) of N-dimethylphosphinylmethyl-4-phenoxyaniline, 7.01 g. (0.030 mole) of p-chlorophenacyl bromide, and 2.00 g. (0.0165 mole) of sym. collidine in 100 ml. of benzene was refluxed for 7 hrs. The mixture was then filtered while hot to remove the precipitated collidine.HBr salt;weight: 2.60 g. (86%). The filtrate was kept overnight and the yellow crystalline product which separated was filtered, washed with benzene, and dried: weight 3.80 g. (60% yield). This was recrystallized twice from absolute ethanol to afford the pure compound in the form of bright yellow crystals, m.p. 171°–175°.

| Anal. Calc. for $C_{23}H_{23}ClNO_3P$ | :64.57% C, 5.42% H, 3.27% N. |
|---|---|
| Found | : 64.33% C, 5.45% H, 3.15% N. |

EXAMPLE 3

N-Dimethylphosphinylmethyl-N-acetyl-4-phenoxyaniline hydrate 2.0 g. (0.02 mole) of triethylamine were added to a solution of 5.0 g. (0.018 mole) of N-dimethylphosphinylmethyl-4-phenoxyaniline, in 50 ml. of benzene. Then 1.8 g. (0.23 mole) of acetyl chloride in 5 ml. of benzene were added dropwise while stirring. After complete addition of the acid chloride (ca. 10 min.), the mixture was stirred at room temperature for one hour. The triethylamine hydrochloride was removed by filtration and the filtrate was concentrated in vacuo to afford a brown oil, 6.2 g. The oil was diluted with 50 ml. of water and scratched with a glass rod to afford a brown solid, 4.6 g. (88% yield). Recrystallization from water (charcoal treatment) followed by a recrystallization from benzene-hexane afforded white flakes of the amide weighing 2.7 g. Drying the amide in a vacuum oven (48°, 48 hours) afforded 2.0 g. of product which analyzed for a monohydrate, m.p. 101°–102°, $C_{17}H_{20}NO_3P \cdot H_2O$.

| Anal. Calc. for $C_{17}H_{20}NO_3P \cdot H_2O$ | : 60.88% C, 6.61% H, 4.17% N. |
|---|---|
| Found | : 60.66% C, 6.55% H, 4.10% N. |

EXAMPLE 4

N-Dimethylphosphinylmethyl-N-(p-fluorobenzoyl)-4-phenoxyaniline 5.0 g. (0.018 mole) of N-dimethylphosphinylmethyl-4-phenoxyaniline were dissolved in 50 ml. of warm benzene and 2.0 g. (0.02 mole) of triethylamine were added. The solution was stirred and cooled to 5° in an ice bath. Then 3.65 g. (0.023 mole) of p-fluorobenzoyl chloride in 5 ml. of benzene was added dropwise at such a rate that the temperature did not rise above 10°. After complete addition of the acid chloride, the reaction was stirred at room temperature for 45 minutes; then the reaction was filtered to remove triethylamine hydrochloride. A white solid formed in the filtrate, and this was collected to give 3.9 g. of product.

The benzene filtrate was combined with the triethylamine hydrochloride, and 100 ml. of chloroform were added to effect solution. The solution was washed with 100 ml. of 3N NaOH, and 100 ml. of water. The organic phase was dried ($Na_2SO_4$), filtered, and the solvent removed under reduced pressure to give 3.3 g. more of product. The solids were combined and recrystallized from benzene (twice) to give 3.1 g. of tan crystals, m.p. 135°–142°. A final recrystallization from ethanol-water (charcoal treatment) afforded 2.1 g. of pure amide m.p. 141°–143°.

| Anal Calc. for $C_{22}H_{21}FNO_3P$ | : 66.49% C, 5.32% H, 3.52% N. |
|---|---|
| Found | : 66.74% C, 5.20% H, 3.66% N. |

EXAMPLE 5

N-Dimethylphosphinylmethyl-N-benzyloxycarbonyl-4-phenoxyaniline 5.50 g. (0.20 mole) of N-dimethylphosphinylmethyl-4-phenoxyaniline were dissolved in 50 ml. of warm anhydrous acetone and 3.36 g. (0.04 mole) of $NaHCO_3$ were added as HCl acceptor. The mixture was stirred and 5.12 g. (0.03 mole) of benzylchloroformate in 5 ml. of anhydrous acetone were added dropwise. After complete addition of the chloroformate (ca. 10 min.), the mixture was stirred at room temperature for 45 minutes. The mixture was filtered and the solvent removed in vacuo to afford a brown oil. The oil was triturated with 100 ml. of ether, the ether decanted from the insolubles, and removed in vacuo to give a brown oil which, when rubbed in the presence of petroleum ether (b.p. 30°–60°), afforded 6.0 g. of a brown solid. The crude solid was triturated with 50 ml. of ether and filtered to afford 3.8 g. (39% yield) of tan crystals. Recrystallization from isopropyl ether (3 times) with pouring off of the supernatant solvent from the initial impure oils that formed gave 0.77 g. of analytically pure carbamate, m.p. 81.5°–83.5°.

| Anal. Calc. for $C_{23}H_{24}NO_4P$ | : 67.47% C, 5.91% H, 3.42% N. |
|---|---|
| Found | : 67.69% C, 5.90% H, 3.41% N. |

EXAMPLE 6

N-Dimethylphosphinylmethyl-3-phenoxyaniline

By proceeding as in Example 1 but starting with 3-phenoxyaniline instead of 4-phenoxyaniline, N- dimethylphosphinylmethyl-3-phenoxyaniline was obtained; pure crystals with m.p. 93.5°–95.0° after recrystallization from toluene.

| | |
|---|---|
| Anal. Calc. for $C_{15}H_{18}NO_2P$ | : 65.44% C, 6.59% H, 5.08% N. |
| Found | : 65.69% C, 6.59% H, 5.00% N. |

EXAMPLE 7

N-Dimethylphosphinylmethyl-N-benzyl-3-phenoxyaniline

A stirred mixture of 8.26 g. (0.03 mole) of N-dimethylphosphinylmethyl-3-phenoxyaniline, 11.3 g. (0.06 mole) of benzylbromide, and 4.0 g. (0.033 mole) of sym. collidine in 100 ml. of benzene was refluxed under $N_2$ for 4 hours. The resulting mixture was filtered while hot to remove the precipitated collidine.HBr salt, wt: 5.00 g. (82.5%). The filtrate was concentrated to an oil which crystallized on standing overnight. The crystals were triturated with 50 ml. of hexane and filtered to remove a small amount of oil. This afforded 6.4 g. (60% yield) of fairly pure product, m.p. 141.5°–144.5°. A single recrystallization from ethanol gave pure white needles, m.p. 143.0°–144.5°.

| | |
|---|---|
| Anal. Calc. for $C_{22}H_{24}NO_2P$ | : 72.31% C, 6.62% H, 3.83% N. |
| Found | : 72.31% C, 6.41% H, 4.22% N. |

EXAMPLE 8

N-Dimethylphosphinylmethyl-2-phenoxyaniline

A stirred mixture of 18.5 g. (0.10 mole) of 2-phenoxyaniline, 23.5 g. (0.20 mole) of chloromethyl dimethylphosphine oxide, and 13.3 g. (0.11 mole) of sym. collidine in 250 ml. of xylene was refluxed under $N_2$ for 7 hrs. The mixture was then cooled to room temperature and 400 ml. of chloroform was added to effect solution. This solution was washed with water, dried over $Na_2SO_4$, and concentrated in vacuo. The resultant oil was triturated with hexane and then with ether, which caused the oil to solidify. This solid, when filtered and dried, was found to weight 13.8 g. (50% yield). Recrystallization first from carbon tetrachloride (2X), and then from toluene afforded pure needles, m.p. 115°–117°.

| | |
|---|---|
| Anal. Calc. for $C_{15}H_{18}NO_2P$ | : 65.44% C, 6.56% H, 5.08% N. |
| Found | : 65.11% C, 6.56% H, 4.97% N. |

EXAMPLE 9

N-Dimethylphosphinylethyl-4-phenoxyaniline

A stirred mixture of 14.1 g. (0.076 mole) of 4-phenoxyaniline, 21.6 g. (0.147 mole) of β-chloroethyl dimethylphosphine oxide and 11.0 g. (0.083 mole) of sym. collidine in 140 ml. of xylene was refluxed under $N_2$ for 7 hrs. The mixture was cooled to room temperature and dissolved in 250 ml. of chloroform. This solution was extracted with water and with brine, dried over $Na_2SO_4$, and concentrated in vacuo to an oil which crystallized on scratching. This material was triturated with ether, filtered and dried to afford 7.5 g. (35% yield). Two recrystallizations from toluene gave pure white needles, m.p. 112.5°–114.5°.

| | |
|---|---|
| Anal. Calc. for $C_{16}H_{20}NO_2P$ | : 66.42% C, 6.97% H, 4.84% N. |
| Found | : 66.36% C, 7.06% H, 4.92% N. |

EXAMPLE 10

N-Dimethylphosphinylpropyl-4-phenoxyaniline hemi-oxalate

A stirred mixture of 27.8 g. (0.15 mole) of 4-phenoxyaniline, 30.9 g. (0.2 mole) of γ-chloropropyl dimethylphosphine oxide, and 20.0 g. (0.165 mole) of sym. collidine in 200 ml. of xylene was refluxed under $N_2$ for 8 hours. The mixture was then cooled and dissolved in 400 ml. of chloroform. This solution was washed with dilute NaCl solution, dried over $MgSO_4$, and concentrated to an oil. The oil was digested on the steam bath for a few minutes with 50 ml. of ether, and then stirred at room temperature for 15 minutes during which the product crystallized as a thick paste. After filtration and washing the cake with ether, 26.2 g. (57.6% yield) of fairly pure tan crystals were obtained. This material slowly darkened on exposure to air and so was stabilized by salt formation.

12.1 g. (0.03 mole) of recrystallized product base dissolved in 25 ml. of tetrahydrofuran were mixed with a filtered solution of 3.6 g. (0.04 mole) of oxalic acid in 15 ml. of tetrahydrofuran. The solution was refrigerated for 4 hours and then the crystalline, virtually white oxalate salt was collected, washed with tetrahydrofuran (2 × 10 ml.) and ether (2 × 25 ml.), and dried to afford 11.6 g. of material. This was recrystallized several times from ethanol to give pure white salt, m.p. 116°–117°, which analyzed correctly for the hemi-oxalate, $C_{17}H_{22}NO_2P.1/2\ (CO_2H)$.

| | |
|---|---|
| Anal. Calc. for $C_{17}H_{22}NO_2P.\frac{1}{2}(CO_2H)_2$ | : 62.06% C, 6.65% H, 4.02% N. |
| Found | : 62.29% C, 6.54% H, 4.00% N. |

EXAMPLE 11

N-(di-n-butylphosphinylmethyl)-4-phenoxyaniline

A stirred mixture of 9.26 g. (0.05 mole) of 4-phenoxyaniline, 14.4 g. (0.07 mole) of chloromethyl di-n-butylphosphine oxide, and 6.67 g. (0.055 mole) of sym. collidine in 100 ml. of xylene was refluxed under $N_2$ for 18 hrs. The mixture was then cooled and dissolved in 250 ml. of chloroform. This solution was washed with water, dried with $Na_2SO_4$, and concentrated in vacuo to an oil which crystallized. Recrystallization first from cyclohexane and then from acetone afforded pure crystals, m.p. 107°–109°.

| | |
|---|---|
| Anal. Calc. for $C_{21}H_{30}NO_2P$ | : 70.17% C, 8.41% H, 3.90% N. |
| Found | : 70.23% C, 8.58% H, 3.89% N. |

EXAMPLE 12

N-Dimethylphosphinylmethyl-4-(o-tolyloxy)aniline

A stirred mixture of 19.9 g. (0.10 mole) of 4-(o-tolyloxy)aniline, 25.3 g. (0.20 mole) of chloromethyl dimethylphosphine oxide, and 13.3 g. (0.11 mole) of sym. collidine in 200 ml. of xylene was refluxed under nitrogen for 10 hours. The mixture was then cooled and dissolved in 400 ml. of chloroform. This solution was washed with water, dried over $Na_2SO_4$, and concentrated to an oil which crystallized overnight. The resulting solid was triturated with 50 ml. of ether and filtered. The filter cake was washed with ether and dried to afford 21.4 g. (74% yield) of tan crystalline product which was fairly pure by TLC and had m.p. 101°–110°. Pure white needles were obtained after two recrystallizations from ethyl acetate, m.p. 114°–115.5°.

| Anal. Calc. for $C_{16}H_{20}NO_2P$ | : 66.42% C, 6.97% H, 4.84% N. |
|---|---|
| Found | : 66.46% C, 6.97% H, 5.09% N. |

EXAMPLE 13

N-Dimethylphosphinylmethyl-2-(o-tolyloxy)aniline

A mixture of 14.0 g. (0.07 mole) of 2-(o-tolyloxy)aniline, 10.6 g. (0.084 mole) of chloromethyl dimethylphosphine oxide, 8.60 g. (0.071 mole) of sym-collidine and 180 ml. of xylene was stirred and refluxed under nitrogen overnight. The mixture was filtered hot to remove collidine hydrochloride, and the filtrate concentrated in vacuo to a brown oil (25.9 g.). Attempts to crystallize the oil failed. On standing for three days a small amount of crystals was visible in the oil; these were collected by diluting the mixture with 100 ml. of ether and filtering the insoluble white solid (1.5 g.). The filtrate was concentrated to an oil which, after standing several days, did not deposit any more product. The oil was triturated with 100 ml. of hexane, the hexane decanted and the oil dried at 3 mm. (27°) for 24 hours. After standing two days, the oil crystallized, and the brown crystals were collected by dilution with ether and filtration. The product (4.4 g.) was combined with the 1.5 g. sample previously isolated and recrystallized (three times) from isopropyl ether to give 2.4 g. of pure white needles, m.p. 91°–93°.

| Anal. Calc. for $C_{16}H_{20}NO_2P$ | : 66.42% C, 6.97% H, 4.84% N. |
|---|---|
| Found | : 66.15% C, 6.95% H, 4.76% N. |

EXAMPLE 14

N-Dimethylphosphinylmethyl-4-(m-tolyloxy)aniline

The procedure of Example 8 was followed except that 4-(m-tolyloxy)aniline was used instead of 2-phenoxyaniline. After trituration of the resulting oil with petroleum ether (b.p. 30°–60°) and cyclohexane, solidification was induced by scratching. Two recrystallizations from ethyl acetate afforded pure white needles, m.p. 120.5°–123.0°.

| Anal. Calc. for $C_{16}H_{20}NO_2P$ | : 66.42% C, 6.97% H, 4.84% N. |
|---|---|
| Found | : 66.50% C, 7.01% H, 4.98% N. |

EXAMPLE 15

N-Dimethylphosphinylmethyl-4-(p-tolyloxy)aniline

A stirred mixture of 25.0 g. (0.125 mole) of 4-(p-tolyloxy)aniline, 31.5 g. (0.250 mole) of chloromethyl dimethylphosphine oxide, and 15.8 g. (0.013 mole) of sym. collidine in 250 ml. of xylene was refluxed under $N_2$ for 7 hrs. The mixture was cooled and dissolved in 250 ml. of chloroform. This solution was washed with water, dried with $Na_2SO_4$, and concentrated in vacuo to a solid weighing 33.3 g. Two recrystallizations from benzene furnished 17.4 g. (48% yield) of pure white needles, m.p. 149°–151°.

| Anal. Calc. for $C_{16}H_{20}NO_2P$ | : 66.42% C, 6.97% H, 4.84% N. |
|---|---|
| Found | : 66.58% C, 7.02% H, 4.80% N. |

EXAMPLE 16

N-Dimethylphosphinylmethyl-2-methyl-4-phenoxyaniline

By proceeding as in Example 1 but starting from 2-methyl-4-phenoxyaniline instead of 4-phenoxyaniline, pure white crystals were obtained having m.p. 171°–173° after recrystallization from ethanol.

| Anal. Calc. for $C_{16}H_{20}NO_2P$ | : 66.42% C, 6.97% H, 4.84% N. |
|---|---|
| Found | : 66.63% C, 6.94% H, 4.93% N. |

EXAMPLE 17

N-Dimethylphosphinylmethyl-4-(p-tert-butylphenoxy)aniline

By proceeding as in Example 12 but starting with 4-(p-tert-butylphenoxy)aniline instead of 4-(o-tolyloxy)aniline, pure white crystals having m.p. 114.5°–116.0° were obtained after two recrystalliations from cyclohexane.

| Anal. Calc. for $C_{19}H_{26}NO_2P$ | : 68.68% C, 7.90% H, 4.22% N. |
|---|---|
| Found | : 68.80% C, 8.00% H, 4.22% N. |

EXAMPLE 18

N-Dimethylphosphinylmethyl-4-(o-cyclohexylphenoxy)aniline

The starting aniline (cf. Table I) was prepared by condensation of potassium o-cyclohexylphenolate with 1-fluoro-4-nitrobenzene in the absence of solvent at 190° for 3 hrs., followed by catalytic reduction of the resulting 2-cyclohexyl-4'-nitrodiphenyl ether in dioxane solution with 10% palladium-on-carbon as catalyst.

By proceeding as in Example 12 but starting with 4-(o-cyclohexylphenoxy)aniline prepared as described above instead of 4-(o-tolyloxy)aniline, pure crystals with m.p. 113°–114° were obtained after two recrystallizations from 1:1 benzene:hexane.

| Anal. Calc. for $C_{21}H_{28}NO_2P$ | : 70.57% C, 7.90% H, 3.92% N. |
|---|---|
| Found | : 70.70% C, 7.85% H, 3.90% N. |

EXAMPLE 19

N-Dimethylphosphinylmethyl-N-ethoxycarbonyl-4-(o-cyclohexylphenoxy)-aniline 1.0 ml. (0.10 mole) of ethyl chloroformate was added to a stirred mixture of 3.00 g. (0.0084 mole) of N-dimethylphosphinylmethyl-4-(o-cyclohexylphenoxy)aniline and 0.87 g. (0.01 mole) of sodium bicarbonate in 50 ml. of chloroform. The mixture was stirred and refluxed until TLC showed no starting material was left (1.5 hours). The mixture was cooled, filtered, and the chloroform removed under reduced pressure to give a clear oil. The oil was chilled, 50 ml. of pet. ether (b.p. 30°–60°) were added, and the oil was rubbed with a glass rod until it solidified into a white mass. The solid was collected, dried and weighed, 3.4 g. (98% yield). The product was recrystallized from cyclohexane to give feathery white needles of pure carbamate, m.p. 121.5°–123°.

| | |
|---|---|
| Anal. Calc. for $C_{24}H_{32}NO_4P$ | : 67.11% C, 7.45% H, 3.26% N. |
| Found | : 67.29% C, 7.42% H, 3.47% N. |

EXAMPLE 20

N-Dimethylphosphinylmethyl-4-(m-$\alpha,\alpha,\alpha$-trifluorotolyloxy)aniline By proceeding as in Example 12, but starting with 4-(m-$\alpha,\alpha,\alpha$-trifluorotolyloxy)aniline (cf. Table I) instead of 4-(o-tolyloxy)aniline, pure white flakes, m.p. 113.5°–115.5° were obtained after two recrystallizations from toluene.

| | |
|---|---|
| Anal. Calc. for $C_{17}H_{17}F_3NO_2P$ | : 55.97% C, 4.99% H, 4.08% N. |
| Found | : 55.86% C, 5.01% H, 3.91% N. |

EXAMPLE 21

N-Dimethylphosphinylmethyl-4-(p-biphenyloxy)aniline

By proceeding as in Example 1 but starting from 4-(p-biphenyloxy)aniline instead of 4-phenoxyaniline, pure white crystals, m.p. 176°–178°, were obtained after recrystallization first from ethanol (charcoal), and then from dioxane.

| | |
|---|---|
| Anal. Calc. for $C_{21}H_{22}NO_2P$ | : 71.78% C, 6.31% H, 3.99% N. |
| Found | : 71.66% C, 6.44% H, 3.99% N. |

EXAMPLE 22

N-Dimethylphosphinylmethyl-4-(p-fluorophenoxy)aniline

The starting aniline (cf. Table I) was prepared by condensation of potassium p-fluorophenolate with 1-fluoro-4-nitrobenzene in refluxing dimethylformamide for 1 hr., followed by catalytic reduction of the resulting 4-fluoro-4′-nitrodiphenyl ether in dioxane solution with 5% palladium-on-carbon as catalyst.

By proceeding as in Example 12, but starting with 4-(p-fluorophenoxy)aniline prepared as described above, pure white crystals having m.p. 141°–142° were obtained after two recrystallizations from benzene.

| | |
|---|---|
| Anal. Calc. for $C_{15}H_{17}FNO_2P$ | : 61.43% C, 5.84% H, 4.78% N. |
| Found | : 61.45% C, 5.75% H, 4.79% N. |

EXAMPLE 23

N-Dimethylphosphinylmethyl-4-(o-chlorophenoxy)aniline sulfate

A stirred mixture of 22.0 g. (0.10 mole) of 4-(o-chlorophenoxy)aniline, 25.3 g. (0.20 mole) of chloromethyl dimethylphosphine oxide, and 13.3 g. (0.11 mole) of sym. collidine in 200 ml. of xylene was refluxed under nitrogen for 10 hours. The mixture was then cooled and dissolved in 400 ml. of chloroform. This solution was washed with water, dried over $Na_2SO_4$, and concentrated first on the rotovac and finally in vacuo to leave an oil which crystallized overnight (30.6 g.). This waxy solid was recrystallized from 120 ml. benzene/50 ml. hexane to afford 19.3 g. (62.5% yield) of grey-white crystals. Two additional recrystallizations from benzene/hexane gave pure (by TLC) white product, but which melted poorly and was hygroscopic.

The free base was therefore converted to a sulfate salt. 2.0 ml. conc. sulfuric acid were added dropwise to a stirred solution of 11.0 g. (0.0355 mole) of pure free base in 70 ml. of absolute ethanol. The white salt crystallized immediately, and after 15 minutes stirring, it was filtered, washed with absolute ethanol and then ether to yield 12.9 g. (89%). This was recrystallized from absolute methanol to give pure white flakes, m.p. 185°–189° dec.

| | |
|---|---|
| Anal. Calc. for $C_{15}H_{17}ClNO_2P \cdot H_2SO_4$ | : 44.18% C, 4.70% H, 3.43% N. |
| Found | : 44.28% C, 4.75% H, 3.39% N. |

EXAMPLE 24

N-Dimethylphosphinylmethyl-4-(m-chlorophenoxy)aniline

By proceeding as in Example 12, but starting with 4-(m-chlorophenoxy)aniline (cf. Table I), pure white needles having m.p. 135.0°–137.5° were obtained after recrystallization first from ethyl acetate and then from acetone.

| | |
|---|---|
| Anal. Calc. for $C_{15}H_{17}ClNO_2P$ | : 58.17% C, 5.53% H, 4.52% N. |
| Found | : 58.39% C, 5.53% H, 4.68% N. |

EXAMPLE 25

N-Dimethylphosphinylmethyl-4-(p-chlorophenoxy)aniline

A stirred mixture of 87.9 g. (0.40 mole) of 4-(p-chlorophenoxy)aniline, 101.2 g. (0.80 mole) of chloromethyl dimethylphosphine oxide and 53.3 g. (0.44 mole) of sym. collidine in 800 ml. of xylene was refluxed under nitrogen for 22 hours. The resulting mixture of solid collidine.HCl salt and green oil was dissolved in 500 ml. of chloroform. This solution was extracted with water, dried over $Na_2SO_4$, and concentrated to a dark oil. Attempts to crystallize this oil failed.

For purification, 50 g. of this oil was dissolved in 250 ml. of methanol, and 20 ml. of concentrated $H_2SO_4$ were added over 0.5 hour with stirring. After chilling the precipitate for 3 hours, the almost white sulfate salt was filtered, washed with cold methanol and ether, then dried in vacuo at 45° to give 17.3 g. Recrystallization from methanol afforded 10.0 g. of pure white sulfate salt.

Reversal to the free base was accomplished by adding 3N-NaOH to a stirred slurry of 8.0 g. of salt. As the mixture turned strongly alkaline, the free base separated in the form of tiny white crystals (5.8 g.). Recrystallization from toluene afforded 4.9 g. of pure product, m.p. 154°–156°.

| Anal. | |
|---|---|
| Calc. for $C_{15}H_{17}ClNO_2P$ | : 58.17% C, 5.53% H, 4.52% N. |
| Found | : 58.31% C, 5.54% H, 4.32% N. |

EXAMPLE 26

N-Dimethylphosphinylmethyl-5-chloro-2-(p-tolyloxy)aniline

A mixture of 14.5 g. (0.026 mole) of 5-chloro-2-(p-tolyloxy)aniline, 6.58 g. (0.052 mole) of chloromethyldimethylphosphine oxide, 6.90 g. (0.028 mole) of sym. collidine and 170 ml. of xylene was stirred and refluxed under nitrogen for 7 hours. After cooling to room temperature, the mixture was diluted with 200 ml. of chloroform, and the solution washed with 200 ml. of water. The chloroform layer was dried ($Na_2SO_4$), filtered and the solvent removed under reduced pressure to give 20.5 g. of a brown oil. The oil was dried at 25° and 3 mm. for 2 hours, and triturated with 200 ml. of cyclohexane. The mixture was stirred and scratched with a glass rod causing a white solid to form. The solid was collected by filtration, and washed with ether. The white solid (10.1 g., 60%) had m.p. 104°–110°. Recrystallization from isopropyl ether (2 ×) afforded 4.9 g. of pure white needles, m.p. 108°–110°.

| Anal. | |
|---|---|
| Calc. for $C_{16}H_{19}ClNO_2P$ | : 59.35% C, 5.92% H, 4.32% N. |
| Found | : 59.07% C, 5.86% H, 4.21% N. |

EXAMPLE 27

N-Dimethylphosphinylmethyl-4-(p-bromophenoxy)aniline

By proceeding as in Example 12, but starting with 4-(p-bromophenoxy)aniline, pure white prisms, m.p. 148°–151°, were obtained after two recrystallizations from ethyl acetate.

| Anal. | |
|---|---|
| Calc. for $C_{15}H_{17}BrNO_2P$ | : 50.85% C, 4.84% H, 3.95% N. |
| Found | : 51.08% C, 4.81% H, 4.00% N. |

EXAMPLE 28

N-Dimethylphosphinylmethyl-4-(o-methoxyphenoxy)aniline

By proceeding as in Example 1 but starting from 4-(o-methoxyphenoxy)aniline, pure white crystals having m.p. 134°–135° were obtained after two recrystallizations from benzene, and finally from acetone.

| Anal. Calc. for $C_{16}H_{20}NO_3P$ | : 62.94% C, 6.60% H, 4.59% N. |
|---|---|
| Found | : 62.70% C, 6.61% H, 4.59% N. |

EXAMPLE 29

N-Dimethylphosphinylmethyl-4-(m-methoxyphenoxy)aniline

By proceeding as in Example 26, but starting with 4-(m-methoxyphenoxy)aniline (cf. Table I), pure crystals having m.p. 110°–112° were obtained after recrystallization first from ethyl acetate/hexane, and then from benzene.

| Anal. Calc. for $C_{16}H_{20}NO_3P$ | : 62.94% C, 6.60% H, 4.59% N. |
|---|---|
| Found | : 62.99% C, 6.57% H, 4.62% N. |

EXAMPLE 30

N-Dimethylphosphinylmethyl-4-(p-methoxyphenoxy)aniline

By proceeding as in Example 12, but starting with 4-(p-methoxyphenoxy)aniline, pure white crystals havinng m.p. 122°–125° were obtained after two recrystallizations from benzene.

| Anal. Calc. for $C_{16}H_{20}NO_3P$ | : 62.94% C, 6.60% H, 4.59% N. |
|---|---|
| Found | : 62.87% C, 6.61% H, 4.51% N. |

EXAMPLE 31

N-Dimethylphosphinylmethyl-4-(p-carbomethoxyphenoxy)aniline

By proceeding as in Example 1 but starting from 4-(p-carbomethoxyphenoxy)aniline, pure white crystals having m.p. 154.5°–156.5° were obtained after recrystallization first from benzene and then from ethanol.

| Anal. Calc. for $C_{17}H_{20}NO_4P$ | : 61.26% C, 6.05% H, 4.20% N. |
|---|---|
| Found | : 61.14% C, 6.16% H, 4.12% N. |

EXAMPLE 32

N-Dimethylphosphinylmethyl-4-(m-dimethylaminophenoxy)aniline

The starting aniline (cf. Table I) was synthesized by condensation of potassium m-dimethylaminophenolate with 1-fluoro-4-nitrobenzene in refluxing dimethylformamide for 1 hr., followed by catalytic reduction of the resulting 3-dimethylamino-4'-nitrodiphenyl ether in dioxane solution with 5% palladium-on-carbon as catalyst.

A mixture of 45.0 g. (0.197 mole) of 4-(m-dimethylaminophenoxy)aniline prepared as described above, 49.8 g. (0.394 mole) of chloromethyldimethylphosphine oxide, 25.5 g. (0.21 mole) of sym-collidine, and 450 ml. of xylene was stirred and refluxed under nitrogen for seven hours. After cooling to room temperature, 900 ml. of chloroform were added, the solution was washed with water (4 × 500 ml.), dried (Na$_2$SO$_4$), and the solvent was removed in vacuo to a brown oil. Rubbing the oil with a glass rod caused the oil to solidify. The brown solid was broken up, triturated with 500 ml. of hexane, and collected. The solid was washed with 250 ml. of hexane, dried, and weighed 45.1 g. Thirty-three grams of the crude solid were triturated with 200 ml. of benzene, and this effectively removed most of the brown color. Twenty-three grams were recrystallized from benzenecyclohexane (2 ×), with decanting the white solid from the initial brown oils that formed. The resultant white solid (4.38 g.) was recrystallized from toluene (3 ×) to give pure white crystals (2.95 g.), m.p. 123°–125°.

| | |
|---|---|
| Anal. Calc. for C$_{17}$H$_{23}$N$_2$O$_2$P | : 64.13% C, 7.28% H, 8.80% N. |
| Found | : 64.27% C, 7.43% H, 8.97% N. |

EXAMPLE 33

N-Dimethylphosphinylmethyl-4-(3,4,5-trimethoxyphenoxy)aniline sulfate

The starting aniline (cf. Table I) I) was prepared by condensation of potassium 3,4,5-trimethoxyphenolate with 1-fluoro-4-nitrobenzene in dimethylformamide at 140°, followed by catalytic reduction of the resulting 3,4,5-trimethoxy-4'-nitrodiphenyl ether in dioxane solution with 5% palladium-on-carbon as catalyst.

A stirred mixture of 22.5 g. (0.078 mole) of 4-(3,4,5-trimethoxyphenoxy) aniline, 19.7 g. (0.086 mole) of chloromethyl dimethylphosphine oxide, and 10.4 g. (0.086 mole) of sym. collidine in 220ml. of xylene was refluxed under N$_2$ for 10 hours. The cooled mixture was then dissolved in 450ml. of chloroform, and this solution was washed with water, dried over Na$_2$SO$_4$, and concentrated in vacuo to an oil which partially solidified on standing overnight. This mixture was digested briefly on the steam bath with 25ml. of toluene, and after stirring for 2 hours at room temperature, the crystalline paste was filtered, washed with toluene and dried to afford 18.3 g. (64% yield). This was recrystallized from 140ml. of toluene to give 14.0 g. of beige crystals, pure by TLC, but darkening on exposure to air.

To stabilize the product, it was converted to a sulfate salt. To a stirred solution of 14.0 g. (0.0383 mole) of product base in 100ml. of ethanol was added 3.0ml. of conc. sulfuric acid. The heavy precipitate was stirred for 15 minutes, filtered, washed with ethanol, then ether, and dried to give 15.1 g. (85% yield) of off-white salt. This was recrystallized twice from 90% aqueous ethanol to furnish pure white sulfate salt, m.p. 195°–197°C. dec.

| | |
|---|---|
| Calc. for C$_{18}$H$_{24}$NO$_5$P.H$_2$SO$_4$ | : 46.65% C, 5.65% H, 3.02% N. |
| Found | : 46.61% C, 5.72% H, 3.13% N. |

EXAMPLE 34

Preparation of Tablet Formulation

| Ingredient | Milligrams per tablet |
|---|---|
| N-dimethylphosphinylmethyl-4-phenoxyaniline hydrochloride | 100 |
| Lactose | 200 |
| Cornstarch (for mix) | 50 |
| Cornstarch (for paste) | 50 |
| Magnesium stearate | 10 |

The active ingredient, lactose, and cornstarch, (for mix) are thoroughly blended together. The cornstarch (for paste) is suspended in water at a ratio of 10 grams of cornstarch per 80 milliliters of water and heated with stirring to form a paste. The paste is then used to granulate the blended powders. The wet granules are screened through a No. 8 sieve and dried at 35°. The dried granules are screened through a No. 16 sieve. The mixture is lubricated with magnesium stearate and compressed into tablets on a suitable tableting machine such that each tablet contains 100 milligrams of active ingredient.

EXAMPLE 35

Preparation of Capsule Formulation

| Ingredient | Milligrams per capsule |
|---|---|
| N-dimethylphosphinylmethyl-4-(p-fluorophenoxy)aniline | 50 |
| Starch | 100 |
| Lactose | 200 |
| Magnesium stearate | 10 |

The active ingredient, starch, lactose and magnesium stearate are thoroughly blended together. The resulting mixture is used to fill hard shell capsules of a fill weight of 360 milligrams per capsule.

We claim:

1. A compound of the formula

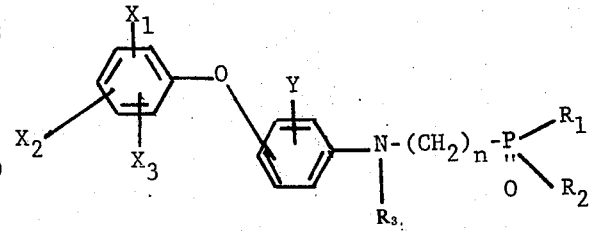

wherein
R$_1$ and R$_2$ are alkyl of 1 to 4 carbon atoms,
n is an integer from 1 to 4,
R$_3$ is hydrogen, or aralkyl of 7 or 8 carbon atoms,
X$_1$, X$_2$ and X$_3$ are hydrogen, halogen, trifluoromethyl, phenyl, alkyl of 1 to 4 carbon atoms, cyclohexyl, alkoxy of 1 to 4 carbon atoms, or dialkylamino of 1 to 4 carbon atoms in each alkyl group, and Y is hydrogen, methyl or chloro, and the pharmaceutically acceptable salts thereof.

2. A compound as defined in claim 1 wherein R$_3$ is hydrogen or benzyl, X$_1$ is hydrogen, alkyl of 1 to 4 carbon atoms, cyclohexyl, chlorine, fluorine, bromine, trifluoromethyl, phenyl, methoxy or dimethylamino,
X$_2$ and X$_3$ are hydrogen, and n is 1, 2 or 3.

3. The compound of claim 1 which is N-dimethylphosphinylmethyl-4-phenoxyaniline.

4. The compound of claim 1 which is N-dimethylphosphinylmethyl-4-(p-tolyloxy)aniline.

5. The compound of claim 1 which is N-dimethylphosphinylmethyl-4-(p-tert-butylphenoxy)aniline.

6. The compound of claim 1 which is N-dimethylphosphinylmethyl-4-(o-cyclohexylphenoxy)aniline.

7. The compound of claim 1 which is N-dimethylphosphinylmethyl-4-(p-fluorophenoxy)aniline.

8. The compound of claim 1 which is N-dimethylphosphinylmethyl-4-(m-chlorophenoxy)aniline.

* * * * *